(12) United States Patent
Aota

(10) Patent No.: US 10,663,636 B2
(45) Date of Patent: May 26, 2020

(54) WIRE GRID POLARIZATION APPARATUS AND PROJECTION-TYPE DISPLAY APPARATUS

(71) Applicant: SEIKO EPSON CORPORATION, Tokyo (JP)

(72) Inventor: Masaaki Aota, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 5 days.

(21) Appl. No.: 16/172,973

(22) Filed: Oct. 29, 2018

(65) Prior Publication Data
US 2019/0129080 A1 May 2, 2019

(30) Foreign Application Priority Data
Oct. 30, 2017 (JP) ................................ 2017-208891

(51) Int. Cl.
*G02B 5/30* (2006.01)
*G02F 1/1335* (2006.01)
*G03B 21/00* (2006.01)

(52) U.S. Cl.
CPC ..... *G02B 5/3058* (2013.01); *G02F 1/133528* (2013.01); *G03B 21/006* (2013.01); *G02F 2001/133548* (2013.01)

(58) Field of Classification Search
CPC .................. G02B 5/3058; G02F 2001/133548
See application file for complete search history.

(56) References Cited

U.S. PATENT DOCUMENTS

| 7,545,564 | B2 | 6/2009 | Wang | |
|---|---|---|---|---|
| 2003/0227678 | A1 | 12/2003 | Lines et al. | |
| 2004/0251792 | A1* | 12/2004 | Matsuda | H03H 9/02984 310/364 |
| 2006/0197919 | A1* | 9/2006 | Fujimori | B21C 37/15 353/61 |
| 2012/0050627 | A1* | 3/2012 | Furuta | G02B 5/3058 349/8 |
| 2012/0075830 | A1* | 3/2012 | Lee | G02B 5/3058 362/19 |
| 2012/0145219 | A1 | 6/2012 | Medwick et al. | |
| 2013/0128358 | A1 | 5/2013 | Hanashima | |

(Continued)

FOREIGN PATENT DOCUMENTS

| JP | 2006-507517 A | 3/2006 |
|---|---|---|
| JP | 2006-517307 A | 7/2006 |

(Continued)

*Primary Examiner* — Alexander P Gross
(74) *Attorney, Agent, or Firm* — Oliff PLC

(57) ABSTRACT

A wire grid polarization apparatus includes a plurality of wire-shaped metal layers arranged in parallel to each other in a region, on which light is incident, on a side of a first surface of a transmissive substrate. The wire-shaped metal layers include aluminum or silver as a principal component. Outside the region, a sacrificial electrode having an ionization tendency greater than an ionization tendency of the wire-shaped metal layers is electrically coupled to the wire-shaped metal layers. This allows the sacrificial electrode to prevent the wire-shaped metal layers from being corroded under a condition of high temperature and high humidity. Being provided outside the region, the sacrificial electrode does not impair polarization separation performance.

9 Claims, 7 Drawing Sheets

(56) References Cited

U.S. PATENT DOCUMENTS

2015/0234230 A1    8/2015  Hirata et al.
2018/0188432 A1*   7/2018  Choi .................. H01L 27/3276

FOREIGN PATENT DOCUMENTS

| JP | 2010-250289 A | 11/2010 |
| JP | 2011-248284 A | 12/2011 |
| JP | 2015-106149 A | 6/2015 |
| WO | 2013/190681 A1 | 12/2013 |

* cited by examiner

WIRE GRID POLARIZATION APPARATUS AND PROJECTION-TYPE DISPLAY APPARATUS

BACKGROUND

1. Technical Field

The invention relates to a wire grid polarization apparatus equipped with a wire grid which includes a plurality of wire-shaped metal layers extending in parallel to each other, and a projection-type display apparatus equipped with the wire grid polarization apparatus.

2. Related Art

A projection-type display apparatus includes a liquid crystal panel, a light source unit configured to emit light to be supplied to the liquid crystal panel, and a projection optical system configured to project light modulated by a light valve. A polarization apparatus is arranged on an optical path extending from the light source unit, via the liquid crystal panel, to the projection optical system. As the polarization apparatus, a wire grid polarization apparatus (inorganic polarization apparatus) has been proposed that includes a wire grid including a plurality of thin wires including aluminum or silver as a principal component and extending in parallel to each other on a first surface of a transmissive substrate.

On the other hand, in the wire grid polarization apparatus, when wire-shaped metal layers including aluminum or silver as a principal component corrode under a condition of high temperature and high humidity, a corrosion product may impair polarization separation performance. It has been proposed that a surface of the wire-shaped metal layer is covered with a protection layer including an aminophosphonate-unimolecular layer (see JP-T-2006-507517).

However, when the surface of the wire-shaped metal layers is covered with the protection layer including the aminophosphonate-unimolecular layer, polarization characteristics of the protection layer lower the polarization separation performance of the wire grid polarization apparatus.

In view of the issue described above, an advantage of some aspects of the invention is to provide a wire grid polarization apparatus configured to prevent wire-shaped metal layers from being corroded without impairing polarization separation performance, and a projection-type display apparatus equipped with the wire grid polarization apparatus.

SUMMARY

In order to address the issue described above, a wire grid polarization apparatus according to the invention includes a transmissive substrate, a wire grid which includes a plurality of wire-shaped metal layers extending in parallel to each other in an effective area, on which light is incident, on a side of a first surface of the transmissive substrate, and a sacrificial electrode provided outside the effective region and including metal having an ionization tendency greater than an ionization tendency of the wire-shaped metal layers.

In the wire grid polarization apparatus according to the invention, the sacrificial electrode including metal having an ionization tendency greater than an ionization tendency of the wire-shaped metal layers is provided. With the wire-shaped metal layers and the sacrificial electrode electrically coupled to each other, when the wire-shaped metal layers come into contact with water under a condition of high temperature and high humidity, and water is present between the wire-shaped metal layers and the sacrificial electrode, the sacrificial electrode serves as a positive electrode, while the wire-shaped metal layers serve as a negative electrode. This prevents the wire-shaped metal layers from being corroded. The sacrificial electrode provided outside the effective region does not impair polarization separation performance of the wire grid polarization apparatus.

In the invention, such an aspect may be adopted that the plurality of wire-shaped metal layers and the sacrificial electrode are electrically coupled to each other outside the effective region. According to the aspect, the wire grid and the sacrificial electrode are electrically coupled to each other beforehand. Therefore, the corrosion of the wire-shaped metal layers can be prevented without a work for electrically coupling the wire-shaped metal layers and the sacrificial electrode, and the like.

In the invention, such an aspect may be adopted that the sacrificial electrode is provided on the transmissive substrate.

In this case, such an aspect may be adopted that the sacrificial electrode is provided on the first surface of the transmissive substrate. Such an aspect may be adopted that the sacrificial electrode is provided on a side surface of the transmissive substrate. Such an aspect may be adopted that the sacrificial electrode is provided on an second surface opposite to the first surface of the transmissive substrate.

In the invention, such an aspect may be adopted that, when the wire grid polarization apparatus includes a support member configured to support the transmissive substrate, the sacrificial electrode is provided on the support member.

In the invention, such an aspect may be adopted that the support member includes metal having an ionization tendency greater than an ionization tendency of the plurality of wire-shaped metal layers, and that the support member constitutes the sacrificial electrode.

In the invention, such an aspect may be adopted that the wire-shaped metal layers include aluminum as a principal component, and that the sacrificial electrode includes magnesium as a principal component. In this case, a standard oxidation reduction potential of magnesium is −2.37 V, while a standard oxidation reduction potential of aluminum is −1.66 V, presenting a great difference in ionization tendency. Magnesium has also an advantage that the chemical stability is higher than a chemical stability of other metal having a high ionization tendency.

In the invention, such an aspect may be adopted that the wire-shaped metal layers include silver as a principal component, and that the sacrificial electrode includes one of magnesium, aluminum, titanium, zirconium, manganese, tantalum, zinc, cobalt, nickel, tin, lead, bismuth, and copper as a principal component. The wire-shaped metal layers including silver as a principal component have an ionization tendency lower than an ionization tendency of the plurality of wire-shaped metal layers including aluminum as a principal component, and advantageously expand the scope of selection of metallic materials that can be used for a sacrificial electrode.

The wire grid polarization apparatus according to the invention can be used for a projection-type display apparatus. The projection-type display apparatus includes a liquid crystal panel, a light source unit configured to emit light to be supplied to the liquid crystal panel, and a projection optical system configured to project light modulated by the liquid crystal panel. The wire grid polarization apparatus is arranged on an optical path extending from the light source unit, via the liquid crystal panel, to the projection optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary Embodiments of the invention will now be described with reference to the accompanying drawings. Further, in each of the drawings described below, to make each layer and each member recognizable in terms of size, each layer and each member are differently scaled. In the below descriptions, a direction in which a wire grid 4 (wire-shaped metal layers 41) extends is referred to as direction Y, while a direction in which the wire-shaped metal layers 41 are arranged in parallel to each other is referred to as direction X.

Exemplary Embodiment 1

Configuration of Wire Grid Polarization Apparatus 1

Figure 1:
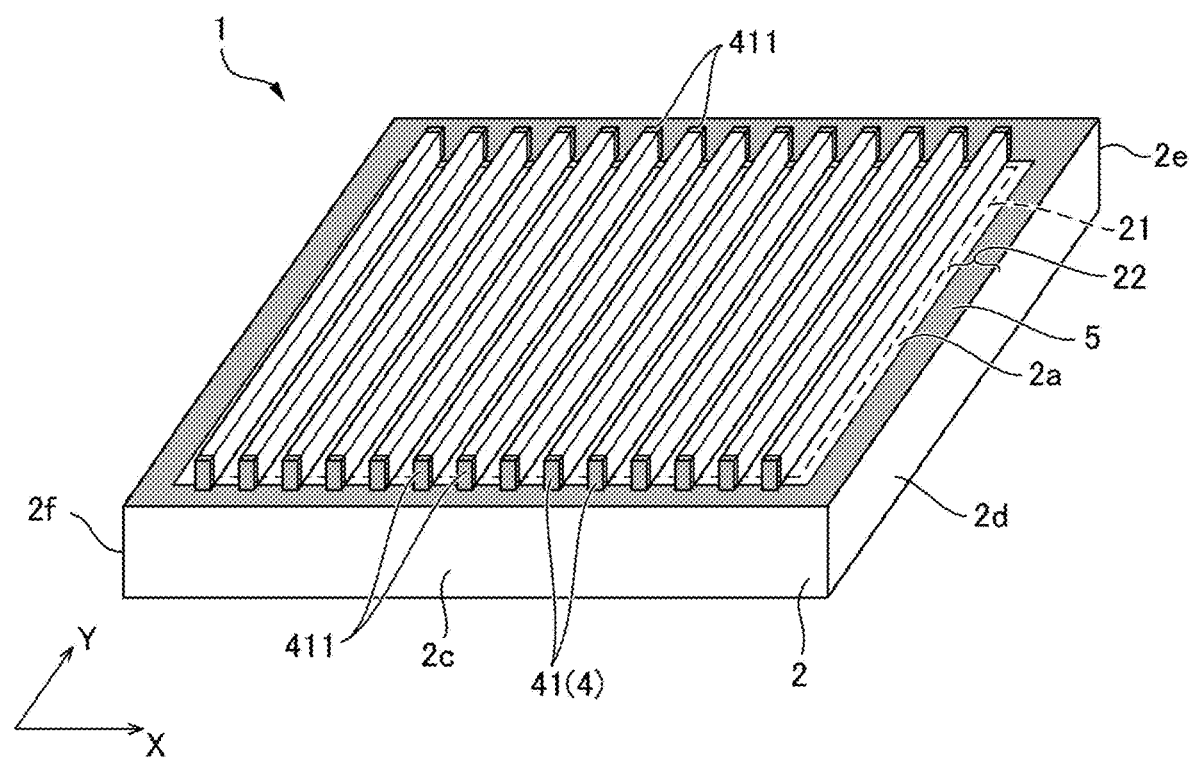
FIG. 1 is a perspective view of a wire grid polarization apparatus according to Exemplary Embodiment 1 of the invention.
Figure 2:
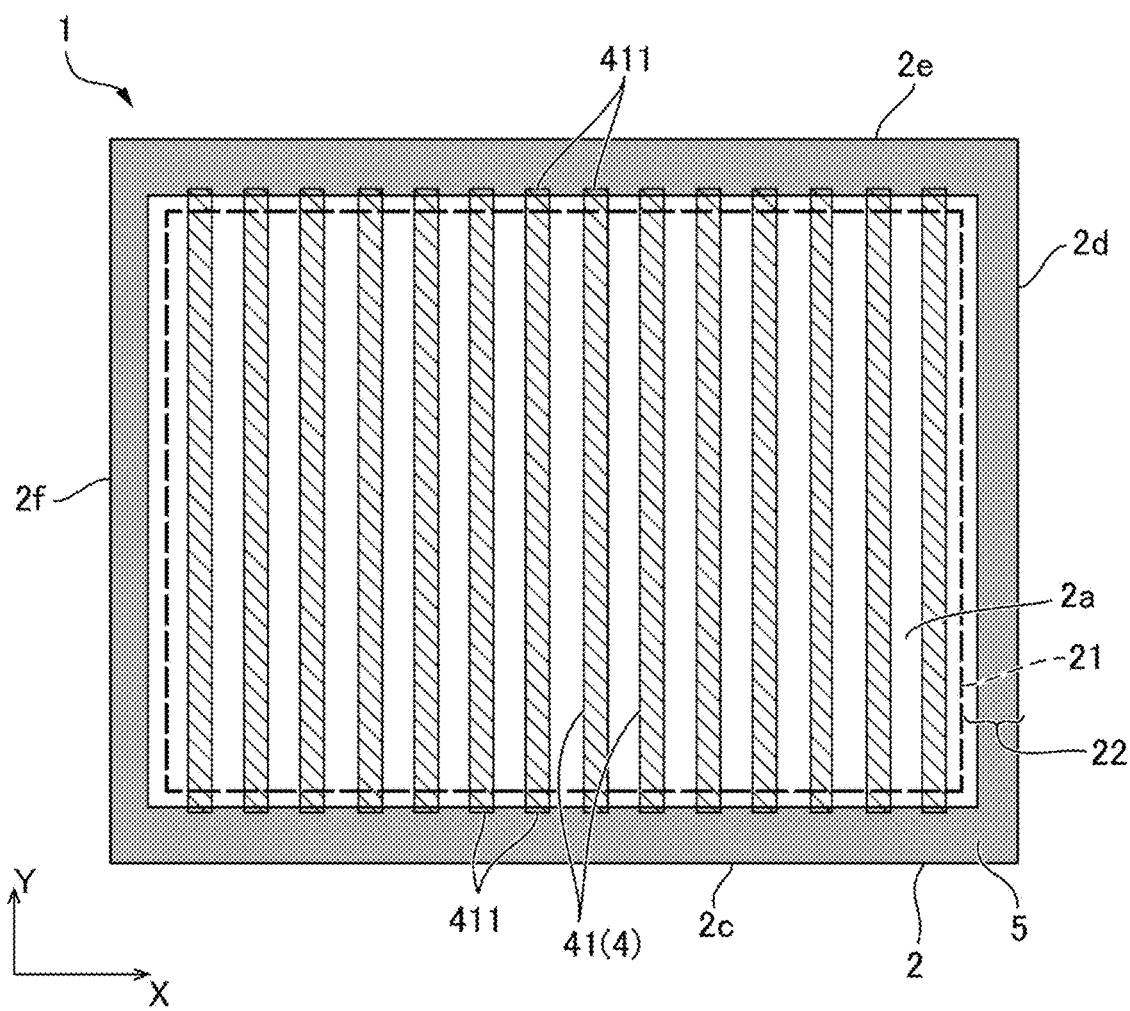
FIG. 2 is a plan view of the wire grid polarization apparatus illustrated in FIG. 1.

FIG. 1 is a perspective view of a wire grid polarization apparatus 1 according to Exemplary Embodiment 1 of the invention. FIG. 2 is a plan view of the wire grid polarization apparatus 1 illustrated in FIG. 1.

The wire grid polarization apparatus 1 illustrated in FIGS. 1 and 2 includes a transmissive substrate 2, and the wire grid 4 of a plurality of the wire-shaped metal layers 41 (thin metallic wires) extending in direction Y at an effective region 21 on which light is incident on a side of a first surface 2a of the transmissive substrate 2, and arranged in parallel to each other in direction X. The plurality of wire-shaped metal layers 41 each include aluminum or silver as a principal component. This allows, within a visible light wavelength region, the wire grid 4 to have a low absorption loss. As the transmissive substrate 2, a glass substrate, a quartz substrate, a crystal substrate, or the like, is used. In the exemplary embodiment, the transmissive substrate 2 is a crystal substrate. The transmissive substrate 2 has a square shape having a side ranging from approximately 20 mm to 30 mm, both inclusive, and a thickness ranging from 0.5 mm to 0.8 mm, both inclusive, for example. A width of the wire-shaped metal layer 41, and a space between the wire-shaped metal layers 41 (a gap between the adjacent wire-shaped metal layers 41) each is 400 nm or smaller, for example. In the exemplary embodiment, the width of the wire-shaped metal layer 41 and the space between the wire-shaped metal layers 41 each range from 50 nm to 200 nm, both inclusive, for example. For example, the width of the wire-shaped metal layer 41 and the space between the wire-shaped metal layers 41 each is 50 nm, while the thicknesses of the wire-shaped metal layer 41 is 200 nm.

In the wire grid 4 configured as described above, when a pitch of the wire-shaped metal layer 41 is sufficiently shorter than a wavelength of incident light, in incident light, first polarization light representing a component having an electric field vector orthogonal to a longer direction of the wire-shaped metal layer 41 passes through, while second polarization light representing a component having an electric field vector parallel to the longer direction of the wire-shaped metal layer 41 is reflected.

Configuration of Sacrificial Electrode 5

In the wire grid polarization apparatus 1, a sacrificial electrode 5 having an ionization tendency greater than an ionization tendency of the wire-shaped metal layers 41 is provided outside the effective region 21. In the exemplary embodiment, the sacrificial electrode 5 is provided on the transmissive substrate 2. More specifically, on the first surface 2a of the transmissive substrate 2, a space between the effective region 21 and side surfaces 2c, 2d, 2e, and 2f of the transmissive substrate 2 defines a peripheral region 22 having a frame shape and surrounding the effective region 21. The peripheral region 22 is provided with the sacrificial electrode 5 having an ionization tendency greater than an ionization tendency of the wire-shaped metal layers 41. In the exemplary embodiment, the wire-shaped metal layer 41 partially protrudes in direction Y from the effective region 21, and extends to the peripheral region 22. On the peripheral region 22, the sacrificial electrode 5 overlaps with end portions 411, in direction Y, of the wire-shaped metal layers 41, and abuts on the wire-shaped metal layers 41. Accordingly, the wire-shaped metal layers 41 and the sacrificial electrode 5 are electrically coupled to each other.

The aspect is achieved by forming the wire grid 4 (wire-shaped metal layers 41) on the first surface 2a of the transmissive substrate 2, and film-forming the sacrificial electrode 5 with the effective region 21 covered by a mask.

Various metals each have a standard oxidation reduction potential $E_0$ as follows. The lower the standard oxidation reduction potential $E_0$, the greater the ionization tendency.

| Lithium | $Li = Li^+ + e^-$ | $E_0 = -3.05$ V |
|---|---|---|
| Cesium | $Cs = Cs^+ + e^-$ | $E_0 = -2.93$ V |
| Rubidium | $Rb = Rb^+ + e^-$ | $E_0 = -2.93$ V |
| Potassium | $K = K^+ + e^-$ | $E_0 = -2.93$ V |
| Barium | $Ba = Ba^{2+} + 2e^-$ | $E_0 = -2.90$ V |
| Strontium | $Sr = Sr^{2+} + 2e^-$ | $E_0 = -2.89$ V |
| Calcium | $Ca = Ca^{2+} + 2e^-$ | $E_0 = -2.87$ V |
| Sodium | $Na = Na^+ + e^-$ | $E_0 = -2.71$ V |
| Magnesium | $Mg = Mg^{2+} + 2e^-$ | $E_0 = -2.37$ V |
| Beryllium | $Be = Be^{2+} + 2e^-$ | $E_0 = -1.85$ V |
| Aluminum | $Al = Al^{3+} + 3e^-$ | $E_0 = -1.66$ V |
| Titanium | $Ti = Ti^{2+} + 2e^-$ | $E_0 = -1.63$ V |
| Zirconium | $Zr = Zr^{4+} + 4e^-$ | $E_0 = -1.53$ V |
| Titanium | $Ti = Ti^{3+} + 3e^-$ | $E_0 = -1.21$ V |
| Manganese | $Mn = Mn^{2+} + 2e^-$ | $E_0 = -1.18$ V |
| Chrome | $Cr = Cr^{2+} + 2e^-$ | $E_0 = -0.91$ V |

-continued

| | | |
|---|---|---|
| Vanadium | $V = V^{3+} + 3e^-$ | $E_0 = -0.88$ V |
| Zinc | $Zn = Zn^{2+} + 2e^-$ | $E_0 = -0.76$ V |
| Chrome | $Cr = Cr^{3+} + 3e^-$ | $E_0 = -0.74$ V |
| Iron | $Fe = Fe^{2+} + 2e^-$ | $E_0 = -0.44$ V |
| Cadmium | $Cd = Cd^{2+} + 2e^-$ | $E_0 = -0.40$ V |
| Indium | $In = In^{2+} + 2e^-$ | $E_0 = -0.34$ V |
| Manganese | $Mn = Mn^{3+} + 3e^-$ | $E_0 = -0.28$ V |
| Nickel | $Ni = Ni^{2+} + 2e^-$ | $E_0 = -0.25$ V |
| Tin | $Sn = Sn^{2+} + 2e^-$ | $E_0 = -0.14$ V |
| Lead | $Pb = Pb^{2+} + 2e^-$ | $E_0 = -0.13$ V |
| Iron | $Fe = Fe^{3+} + 3e^-$ | $E_0 = -0.04$ V |
| Copper | $Cu = Cu^{2+} + 2e^-$ | $E_0 = +0.34$ V |
| Copper | $Cu = Cu^+ + e^-$ | $E_0 = +0.52$ V |
| Silver | $Ag = Ag^+ + e^-$ | $E_0 = +0.80$ V |

Accordingly, when the wire-shaped metal layers 41 include aluminum as a principal component, the sacrificial electrode 5 includes metal containing magnesium as a principal component, and the like. In this case, a standard oxidation reduction potential of magnesium is −2.37 V, while a standard oxidation reduction potential of aluminum is −1.66 V, presenting a great difference in ionization tendency. Magnesium has also an advantage that the chemical stability is higher than a chemical stability of other metal having a greater ionization tendency. When the wire-shaped metal layers 41 include silver as a principal component, the sacrificial electrode 5 includes metal containing one of magnesium, aluminum, titanium, zirconium, manganese, tantalum, zinc, cobalt, nickel, tin, lead, bismuth, and copper as a principal component, and the like. The wire-shaped metal layers 41 including silver as a principal component have an ionization tendency smaller than an ionization tendency of the wire-shaped metal layers 41 including aluminum as a principal component, and advantageously expand the scope of selection of metallic materials that can be used for the sacrificial electrode 5.

Principal Effects of Exemplary Embodiment

As described above, in the wire grid polarization apparatus 1 according to the exemplary embodiment, the sacrificial electrode 5 including metal having an ionization tendency greater than an ionization tendency of the wire-shaped metal layers 41 is provided. Therefore, with the wire-shaped metal layers 41 and the sacrificial electrode 5 electrically coupled to each other, when the wire-shaped metal layers 41 come into contact with water under a condition of high temperature and high humidity, and water is present between the wire-shaped metal layers 41 and the sacrificial electrode 5, the sacrificial electrode 5 serves as a positive electrode, while the wire-shaped metal layers 41 serve as a negative electrode. This prevents the wire-shaped metal layers 41 from being corroded due to impurities in water. The sacrificial electrode 5 provided outside the effective region 21 does not impair the polarization separation performance of the wire grid polarization apparatus 1.

In the exemplary embodiment, the wire-shaped metal layers 41 and the sacrificial electrode 5 are electrically coupled to each other beforehand. Therefore, the corrosion of the wire-shaped metal layers 41 can be prevented without a work for electrically coupling the wire-shaped metal layers 41 and the sacrificial electrode 5, and the like.

Exemplary Embodiment 2

Figure 3:
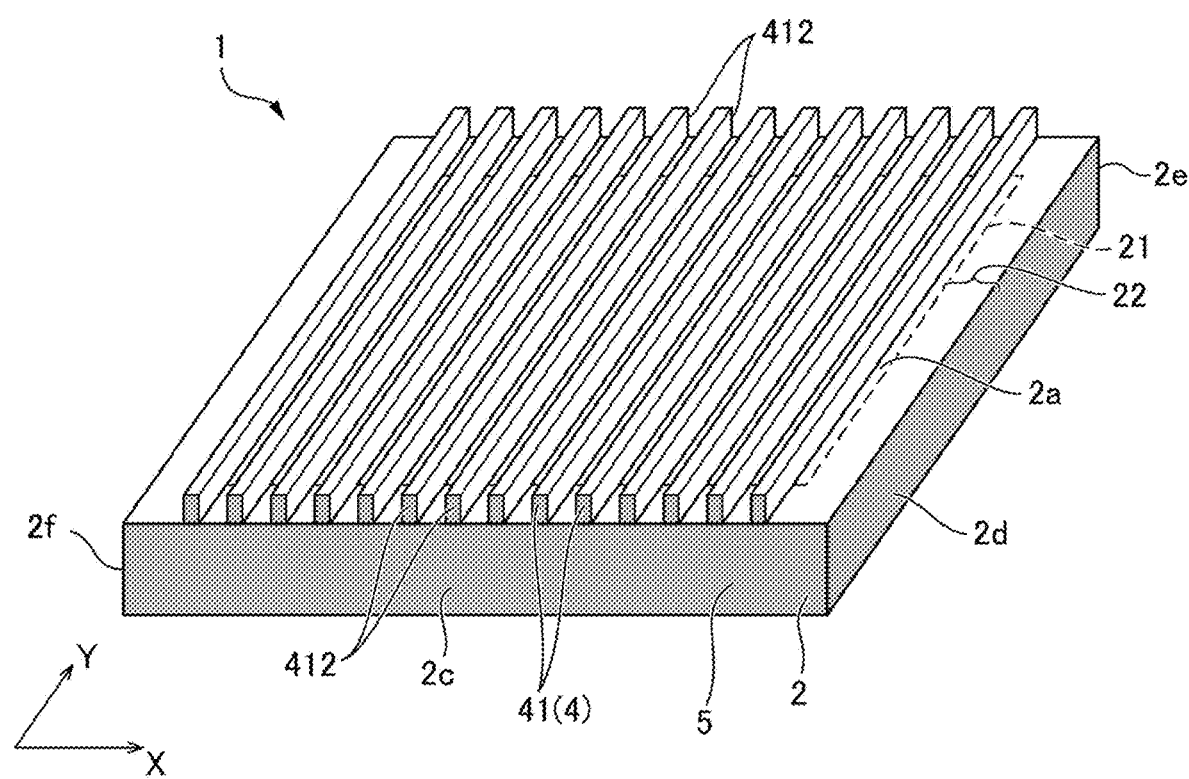
FIG. 3 is a perspective view of a wire grid polarization apparatus according to Exemplary Embodiment 2 of the invention.
Figure 4:
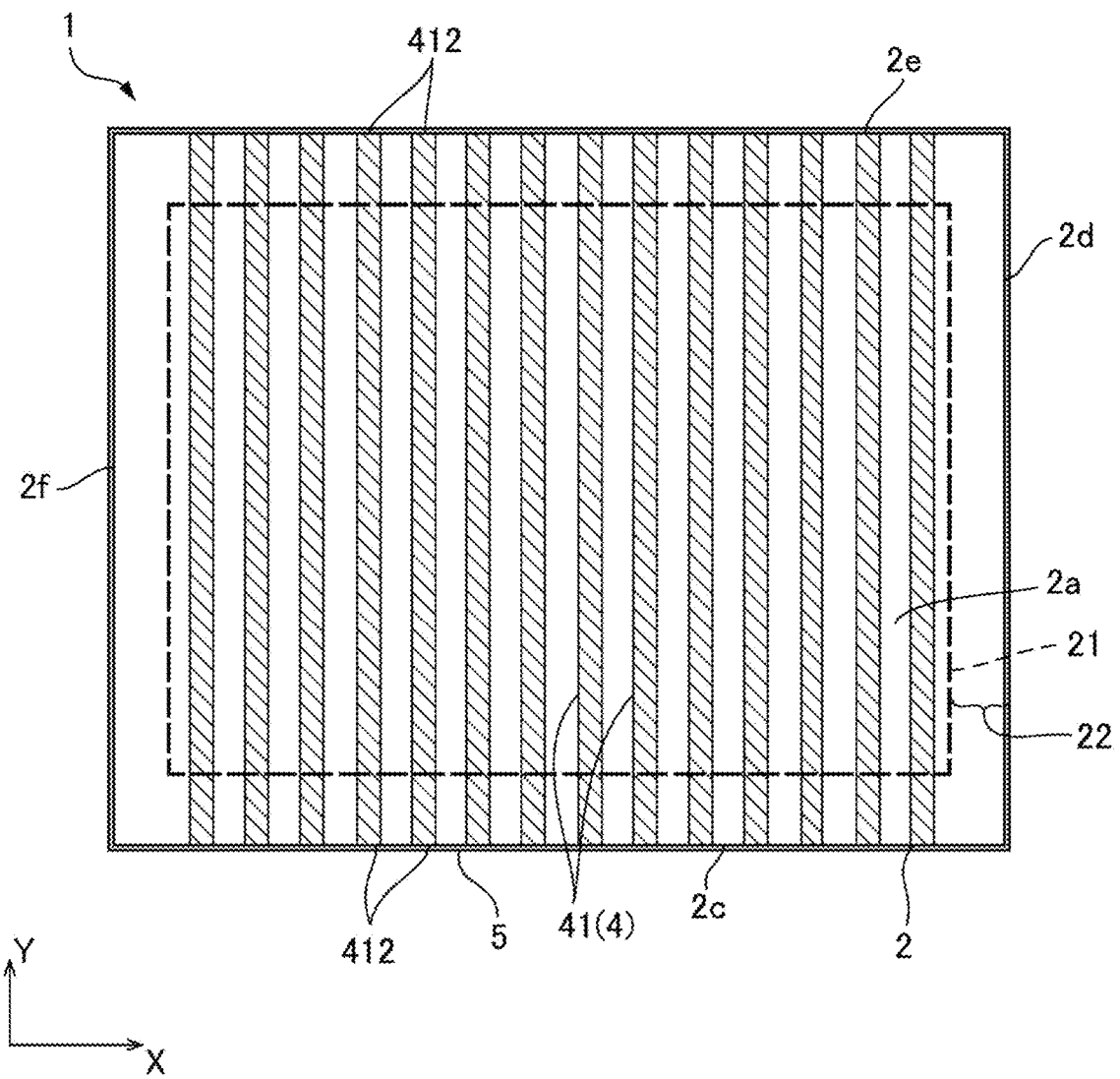
FIG. 4 is a plan view of the wire grid polarization apparatus illustrated in FIG. 3.

FIG. 3 is a perspective view of a wire grid polarization apparatus 1 according to Exemplary Embodiment 2 of the invention. FIG. 4 is a plan view of the wire grid polarization apparatus 1 illustrated in FIG. 3. Note that the basic configuration of Exemplary Embodiment 2 and exemplary embodiments described below is the same as the configuration of Exemplary Embodiment 1, and thus common portions have the same reference signs and description of the common portions will be omitted.

As illustrated in FIGS. 3 and 4, similar to Exemplary Embodiment 1, the wire grid polarization apparatus 1 according to the exemplary embodiment includes a transmissive substrate 2, and a wire grid 4 of a plurality of wire-shaped metal layers 41 extending in direction Y on a side of a first surface 2a of an effective region 21 on which light is incident from the transmissive substrate 2, and arranged in parallel to each other in direction X, The plurality of wire-shaped metal layers 41 each include aluminum or silver as a principal component. In the wire grid polarization apparatus 1 according to the exemplary embodiment, similar to Exemplary Embodiment 1, a sacrificial electrode 5 having an ionization tendency greater than an ionization tendency of the wire-shaped metal layers 41 is provided outside the effective region 21. More specifically, when the wire-shaped metal layers 41 include aluminum, the sacrificial electrode 5 includes metal containing magnesium as a principal component, and the like. When the wire-shaped metal layers 41 include silver, the sacrificial electrode 5 includes metal containing one of magnesium, aluminum, titanium, zirconium, manganese, tantalum, zinc, cobalt, nickel, tin, lead, bismuth, and copper as a principal component, and the like.

In the exemplary embodiment, the sacrificial electrode 5 is provided on the transmissive substrate 2. More specifically, the sacrificial electrode 5 having an ionization tendency greater than an ionization tendency of the wire-shaped metal layers 41 is provided on at least one of side surfaces 2c, 2d, 2e, and 2f of the transmissive substrate 2. In the exemplary embodiment, the sacrificial electrode 5 is provided on all of the side surfaces 2c, 2d, 2e, and 2f of the transmissive substrate 2. The wire-shaped metal layers 41 and the sacrificial electrode 5 are electrically coupled to each other. More specifically, the wire-shaped metal layer 41 partially protrudes in direction Y from the effective region 21, and extends to an outer edge of the peripheral region 22. On the outer edge of the peripheral region 22, the sacrificial electrode 5 overlaps with end faces 412, in direction Y, of the wire-shaped metal layers 41, and abuts on the wire-shaped metal layers 41.

The aspect is achieved by forming the wire grid 4 (wire-shaped metal layers 41) on the first surface 2a of the transmissive substrate 2, and forming the sacrificial electrode 5 on the side surfaces 2c, 2d, 2e, and 2f of the transmissive substrate 2 with the effective region 21 covered by a mask.

With the wire grid polarization apparatus 1 configured as described above, similar to Exemplary Embodiment 1, the sacrificial electrode 5 can prevent the wire-shaped metal layers 41 from being corroded. The sacrificial electrode 5, provided outside the effective region 21, has effects similar to effects of Exemplary Embodiment 1. The sacrificial electrode 5 does not impair polarization separation performance of the wire grid polarization apparatus 1, for example.

Exemplary Embodiment 3

Figure 5:
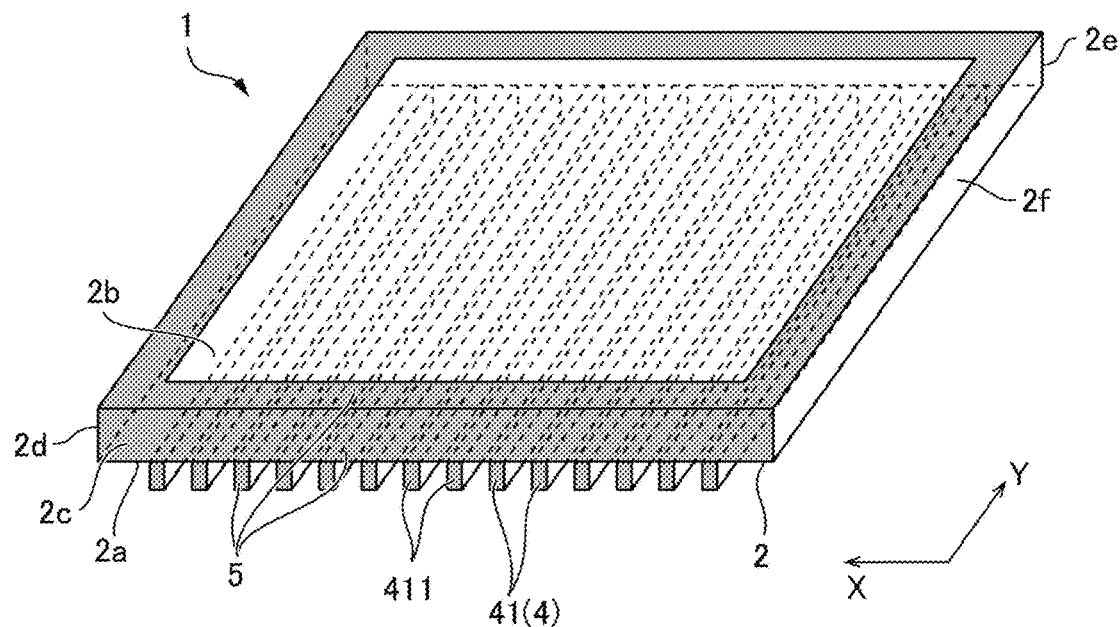
FIG. 5 is a perspective view of a wire grid polarization apparatus according to Exemplary Embodiment 3 of the invention when viewed from its rear surface.
Figure 6:
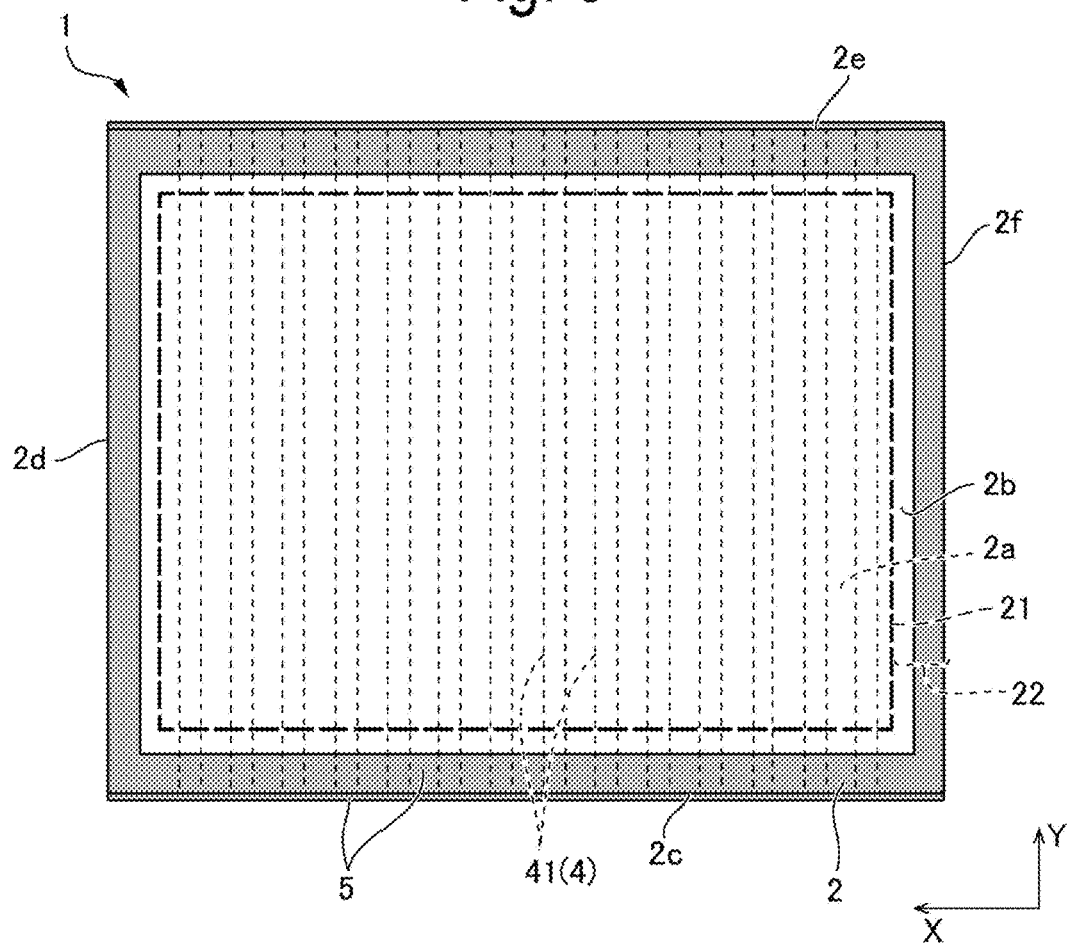
FIG. 6 is a bottom view of the wire grid polarization apparatus illustrated in FIG. 5.

FIG. 5 is a perspective view of a wire grid polarization apparatus 1 according to Exemplary Embodiment 3 of the invention, when viewed from its rear surface. FIG. 6 is a bottom view of the wire grid polarization apparatus 1 illustrated in FIG. 5. As illustrated in FIGS. 5 and 6, similar to Exemplary Embodiment 1, the wire grid polarization apparatus 1 according to the exemplary embodiment includes a transmissive substrate 2, and a wire grid 4 of a plurality of wire-shaped metal layers 41 extending in direction Y on a side of a first surface 2a of an effective region 21 on which light is incident from the transmissive substrate 2, and arranged in parallel to each other in direction X. The plurality of wire-shaped metal layers 41 each include aluminum or silver as a principal component. In the wire grid polarization apparatus 1 according to the exemplary embodiment, similar to Exemplary Embodiment 1, a sacrificial electrode 5 having an ionization tendency greater than an ionization tendency of the wire-shaped metal layers 41 is provided outside the effective region 21. More specifically, when the wire-shaped metal layers 41 include aluminum, the sacrificial electrode 5 includes metal containing magnesium as a principal component, and the like. When the wire-shaped metal layers 41 include silver, the sacrificial electrode 5 includes metal containing one of magnesium, aluminum, titanium, zirconium, manganese, tantalum, zinc, cobalt, nickel, tin, lead, bismuth, and copper as a principal component, and the like.

In the exemplary embodiment, the sacrificial electrode 5 is provided on the transmissive substrate 2. More specifically, on a second surface 2b (rear surface), opposite to the first surface 2a on which the wire-shaped metal layers 41 are formed, of the transmissive substrate 2, the sacrificial electrode 5 having an ionization tendency greater than an ionization tendency of the wire-shaped metal layers 41 is provided in a frame shape to overlap with a peripheral region 22 in a plan view.

The wire-shaped metal layer 41 partially protrudes in direction Y from the effective region 21, and extends to an outer edge of the peripheral region 22. The sacrificial electrode 5 is also provided on the side surfaces 2c and 2e of the transmissive substrate 2. The sacrificial electrode 5 is also formed on end faces 411, in direction Y, of the wire-shaped metal layers 41 on the outer edge of the peripheral region 22. Accordingly, the wire-shaped metal layers 41 and the sacrificial electrode 5 formed on the second surface 2b are electrically coupled to each other via the side surfaces 2c and 2e of the transmissive substrate 2, and the sacrificial electrode 5 formed on the end faces 411, in direction Y, of the wire-shaped metal layers 41.

The aspect is achieved by forming the wire grid 4 (wire-shaped metal layers 41) on the first surface 2a of the transmissive substrate 2, and forming the sacrificial electrode 5 on the second surface 2b and the side surfaces 2c and 2e of the transmissive substrate 2 with the effective region 21 covered by a mask.

With the wire grid polarization apparatus 1 configured as described above, similar to Exemplary Embodiment 1, the sacrificial electrode 5 can prevent the wire-shaped metal layers 41 from being corroded. The sacrificial electrode 5, provided outside the effective region 21, has effects similar to effects of Exemplary Embodiment 1. The sacrificial electrode 5 does not impair polarization separation performance of the wire grid polarization apparatus 1, for example.

Exemplary Embodiment 4

Figure 7:
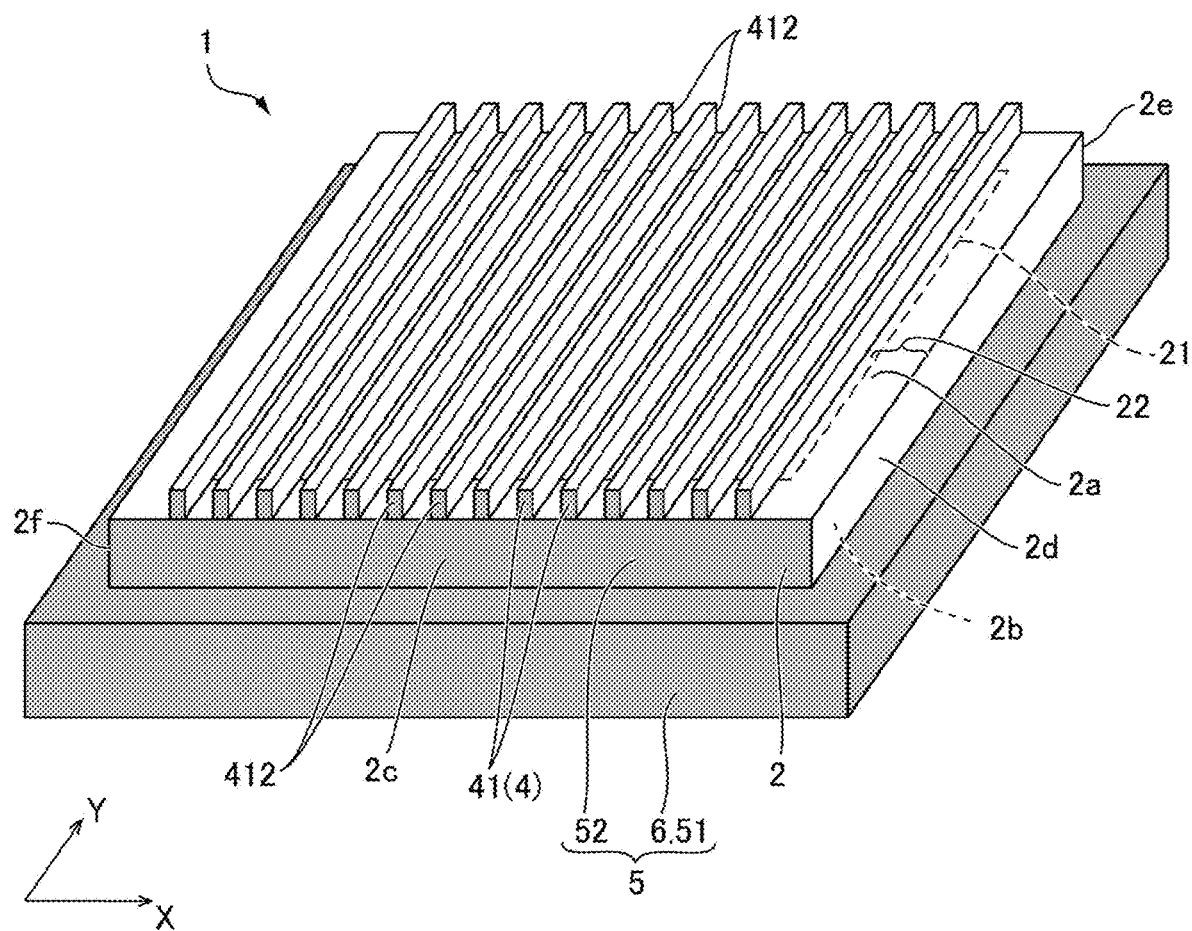
FIG. 7 is a perspective view of a wire grid polarization apparatus according to Exemplary Embodiment 4 of the invention.

FIG. 7 is a perspective view of a wire grid polarization apparatus 1 according to Exemplary Embodiment 4 of the invention. As illustrated in FIG. 7, similar to Exemplary Embodiment 1, the wire grid polarization apparatus 1 according to the exemplary embodiment includes a transmissive substrate 2, and a wire grid 4 of a plurality of wire-shaped metal layers 41 extending in direction Y on a side of a first surface 2a of an effective region 21 on which light is incident from the transmissive substrate 2, and arranged in parallel to each other to direction X. The plurality of wire-shaped metal layers 41 each include aluminum or silver as a principal component.

In the exemplary embodiment, the wire grid polarization apparatus 1 includes a support member 6 configured to abut on a second surface 2b of the transmissive substrate 2 and support the transmissive substrate 2. The support member 6 is a frame-shaped member provided with an opening (not illustrated) in a region overlapping with the effective region 21 of the transmissive substrate 2 in a plan view. In the exemplary embodiment, the transmissive substrate 2 and the support member 6 are fixed with an adhesive (not illustrated) coated across the side surfaces 2c, 2d, 2e, and 2f of the transmissive substrate 2 and the support member 6. The transmissive substrate 2 and the support member 6 may be fixed with a conductive adhesive (not illustrated) coated between the second surface 2b of the transmissive substrate 2 and the support member 6.

In the wire grid polarization apparatus 1 configured as described above, similar to Exemplary Embodiment 1, a sacrificial electrode 5 having an ionization tendency greater than an ionization tendency of the wire-shaped metal layers 41 is provided outside the effective region 21. More specifically, when the wire-shaped metal layers 41 include aluminum, the sacrificial electrode 5 includes metal containing magnesium as a principal component, and the like. When the wire-shaped metal layers 41 include silver, the sacrificial electrode 5 includes metal containing one of magnesium, aluminum, titanium, zirconium, manganese, tantalum, zinc, cobalt, nickel, tin, lead, bismuth, and copper as a principal component, and the like.

In the exemplary embodiment, the sacrificial electrode 5 is provided on the support member 6. In the exemplary embodiment, the support member 6 includes metal having an ionization tendency greater than an ionization tendency of the wire-shaped metal layers 41. The support member 6 constitutes a first sacrificial electrode 51.

The first sacrificial electrode 51 is electrically coupled to the wire-shaped metal layers 41. In the exemplary embodiment, to electrically couple the first sacrificial electrode 51 to the wire-shaped metal layers 41, a second sacrificial electrode 52 is provided on the transmissive substrate 2 to electrically couple the first sacrificial electrode 51, via the second sacrificial electrode 52, to the wire-shaped metal layers 41. More specifically, in the transmissive substrate 2, similar to Exemplary Embodiment 3, the wire-shaped metal layer 41 partially protrudes in direction Y from the effective region 21, and extends to an outer edge of a peripheral region 22. The second sacrificial electrode 52 is provided on the second surface 2b and the side surfaces 2c and 2e of the transmissive substrate 2. The second sacrificial electrode 52 is also formed on end faces 412, in direction Y, of the wire-shaped metal layers 41 on the outer edge of the peripheral region 22. The second sacrificial electrode 52 formed on the second surface 2b of the transmissive substrate 2 abuts on the support member 6. Accordingly, the wire-shaped metal layers 41 and the support member 6 (first sacrificial electrode 51) are electrically coupled to each other via the second sacrificial electrode 52 formed on the second surface 2b and the side surfaces 2c and 2e of the transmissive substrate 2, and the end faces 412, in direction Y, of the wire-shaped metal layers 41. Therefore, the sacrificial electrode 5 is constituted by the first sacrificial electrode 51 and the second sacrificial electrode 52.

With the wire grid polarization apparatus 1 configured as described above, similar to Exemplary Embodiment 1, the sacrificial electrode 5 can prevent the wire-shaped metal layers 41 from being corroded. The sacrificial electrode 5, provided outside the effective region 21, has effects similar to effects of Exemplary Embodiment 1. The sacrificial electrode 5 does not impair polarization separation performance of the wire grid polarization apparatus 1, for example.

Exemplary Embodiment 5

In Exemplary Embodiments 1 to 3, described above, the wire-shaped metal layers 41 and the sacrificial electrode 5 are electrically coupled to each other. However, such an aspect may be adopted that the wire-shaped metal layers 41 and the sacrificial electrode 5 are not electrically coupled to each other, while the wire-shaped metal layers 41 and the sacrificial electrode 5 are electrically coupled to each other when the wire grid polarization apparatus 1 is placed under a condition of high temperature and high humidity. For example, in Exemplary Embodiment 4, such an aspect may be adopted that when the second sacrificial electrode 52 is not formed on the transmissive substrate 2, and the wire grid polarization apparatus 1 is placed under a condition of high temperature and high humidity, a conducting member (not illustrated) is used to electrically couple the wire-shaped metal layers 41 and the support member 6 (sacrificial electrode 5 and first sacrificial electrode 51). In Exemplary Embodiment 3, such an aspect may be adopted that when the sacrificial electrode 5 is not formed on the second surface 2b and the side surfaces 2c and 2e of the transmissive substrate 2, and the wire grid polarization apparatus 1 is placed under a condition of high temperature and high humidity, a conducting member (not illustrated) is used to electrically couple the wire-shaped metal layers 41 and the sacrificial electrode 5.

Exemplary Embodiment 6

In the exemplary embodiments described above, the wire grid 4 is constituted by only the wire-shaped metal layers 41 including aluminum, silver, and the like. However, the invention may be applied when a light-absorbing layer is layered on an end face, opposite to the transmissive substrate 2, of each of the wire-shaped metal layers 41. In this case, the light-absorbing layer may include a semiconductor film such as silicon, germanium, and the like, in terms of preventing, by a local cell formed between the wire-shaped metal layers 41 and the light-absorbing layer under a condition of high temperature and high humidity, either of the wire-shaped metal layers 41 and the light-absorbing layer from being corroded.

Configuration Examples of Projection-Type Display Apparatus

Figure 8:
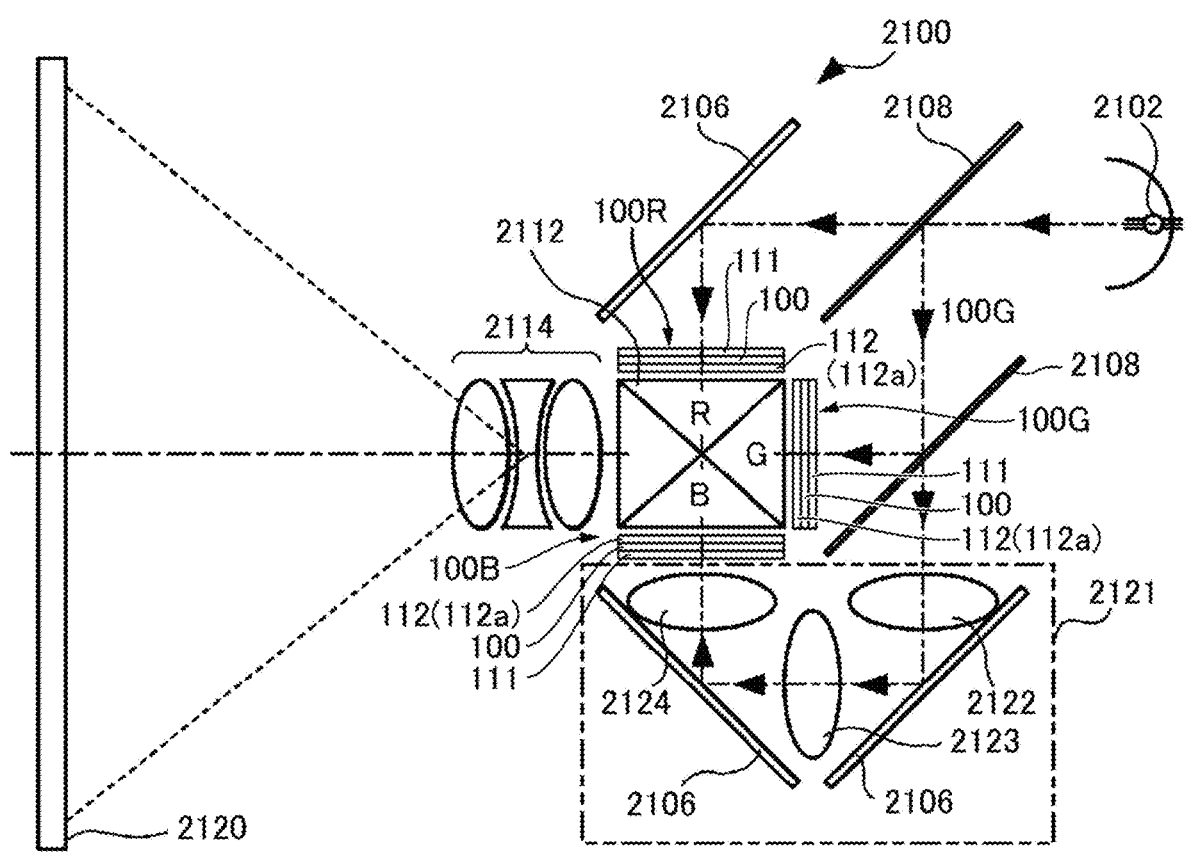
FIG. 8 is an explanatory view of a projection-type display apparatus using a transmission type liquid crystal panel.

A projection-type display apparatus (liquid crystal projector) using one of the wire grid polarization apparatuses 1 according to the exemplary embodiments described above will now be described. FIG. 8 is an explanatory view of a projection-type display apparatus using a transmission type liquid crystal panel. A projection-type display apparatus 2100 illustrated in FIG. 8 is provided with a liquid crystal panel, a light source unit configured to emit light to be supplied to the liquid crystal panel, and a projection optical system configured to project light modulated by the liquid crystal panel. One of the wire grid polarization apparatuses 1 described with reference to FIGS. 1 to 7 is arranged on an optical path extending from the light source unit, via the liquid crystal panel, to the projection optical system.

The projection-type display apparatus 2100 illustrated in FIG. 8 is provided with a lamp unit 2102 (light source unit) with a white light source, including a halogen lamp and the like. Incident light emitted from the lamp unit 2102 is separated into three fundamental colors of red (R) color, green (G) color, and blue (B) color by three mirrors 2106 and two dichroic mirrors 2108 arranged internally. The separated incident light is respectively guided, for modulation, into light valves 100R, 100G, and 100B corresponding to the fundamental colors. B-color light is longer in optical path than R-color light and G-color light. Therefore, to reduce its loss, B-color light is guided via a relay lens system 2121 including an incident lens 2122, a relay lens 2123, and an emission lens 2124. The light valves 100R, 100G, and 100B each include an incident-side polarization separation element 111 overlapping, on an incident side, with the liquid crystal panel 100, and an emission-side polarization separation element 112 overlapping, on an emission side, with the liquid crystal panel 100.

Light modulated by the light valves 100R, 100G, and 100B enters, in three directions, into a dichroic prism 2112. R-color light and B-color light are reflected, by the dichroic prism 2112, at an angle of 90 degrees, while G-color light passes through the dichroic prism 2112. After the fundamental colors are synthesized to form a color image, a projection lens group 2114 (projection optical system) projects the color image onto a screen 2120.

In the projection-type display apparatus 2100 (electronic apparatus) configured as described above, one of the wire grid polarization apparatuses 1 applied with the invention is used in either or both of the incident-side polarization separation element 111 and the emission-side polarization separation element 112 used for the light valves 100R, 100G, and 100B.

Other Projection-type Display Apparatuses

A projection-type display apparatus may be configured to use, as a light source unit, an LED light source configured to emit light in various colors, and the like to supply light in various colors emitted from the LED light source to another liquid crystal apparatus. In the projection-type display apparatus 2100 illustrated in FIG. 8, transmission type liquid crystal panels 100 are used for the light valves 100R, 100G, and 100B. However, in a projection-type display apparatus using a reflection type liquid crystal panel, one of the wire grid polarization apparatuses 1 described with reference to FIGS. 1 to 7 may be arranged on an optical path extending from a light source unit, via a liquid crystal panel, to a projection optical system.

Other Electronic Apparatuses

An electronic apparatus equipped with one of the wire grid polarization apparatuses 1 to which the invention is applied is not limited to the projection-type display apparatus 2100 according to the exemplary embodiment described above. For example, the wire grid polarization apparatus 1 to which the invention is applied may be used in an electronic apparatus, such as a projection type head-up display (HUD), direct-viewing type head-mounted display (HMD), a personal computer, a digital still camera, and a liquid crystal television.

The entire disclosure of Japanese Patent Application No. 2017-208891, filed Oct. 30, 2017 is expressly incorporated by reference herein.

What is claimed is:

1. A wire grid polarization apparatus comprising:
a transmissive substrate;
a plurality of wire-shaped metal layers extending in parallel to each other in a region, on which light is incident, on a side of a first surface of the transmissive substrate, the plurality of wire-shaped metal layers extending from the region to the outside of the region; and
a sacrificial electrode provided outside the region and including metal having an ionization tendency greater than an ionization tendency of the plurality of wire-shaped metal layers, the sacrificial electrode being provided on a side surface of the transmissive substrate and end faces of the plurality of wire-shaped metal layers.

2. The wire grid polarization apparatus according to claim 1, wherein the plurality of wire-shaped metal layers and the sacrificial electrode are electrically coupled to each other outside the region.

3. The wire grid polarization apparatus according to claim 1, wherein the sacrificial electrode is provided on the first surface of the transmissive substrate.

4. The wire grid polarization apparatus according to claim 1, wherein the sacrificial electrode is provided on a second surface opposite to the first surface of the transmissive substrate.

5. The wire grid polarization apparatus according to claim 1,
wherein the plurality of wire-shaped metal layers include aluminum as a principal component, and
the sacrificial electrode includes magnesium as a principal component.

6. The wire grid polarization apparatus according to claim 1,
wherein the plurality of wire-shaped metal layers include silver as a principal component, and
the sacrificial electrode includes one of magnesium, aluminum, titanium, zirconium, manganese, tantalum, zinc, cobalt, nickel, tin, lead, bismuth, and copper as a principal component.

7. A projection-type display apparatus including the wire grid polarization apparatus according to claim 1, the projection-type display apparatus comprising:
a liquid crystal panel;
a light source unit configured to emit light to be supplied to the liquid crystal panel; and
a projection optical system configured to project light modulated by the liquid crystal panel,
wherein the wire grid polarization apparatus is arranged on an optical path extending from the light source unit, via the liquid crystal panel, to the projection optical system.

8. The wire grid polarization apparatus according to claim 1,
further comprising a support member configured to support the transmissive substrate,
wherein the sacrificial electrode is provided on the support member.

9. The wire grid polarization apparatus according to claim 8,
wherein the support member includes metal having an ionization tendency greater than an ionization tendency of the plurality of wire-shaped metal layers, and
the sacrificial electrode includes the support member.

* * * * *